(12) United States Patent
Sebastian et al.

(10) Patent No.: US 10,571,573 B2
(45) Date of Patent: Feb. 25, 2020

(54) DEVICES, SYSTEMS, AND METHODS FOR REAL TIME TRACKING OF AN OBJECT

(71) Applicant: DSCG SOLUTIONS, INC., Chantilly, VA (US)

(72) Inventors: Richard Sebastian, Frederick, MD (US); Kendall Belsley, Falls Church, VA (US)

(73) Assignee: DSCG Solutions, Inc., Chantilly, VA (US)

( * ) Notice: Subject to any disclaimer, the term of this patent is extended or adjusted under 35 U.S.C. 154(b) by 0 days.

(21) Appl. No.: 16/011,478

(22) Filed: Jun. 18, 2018

(65) Prior Publication Data

US 2018/0299555 A1    Oct. 18, 2018

Related U.S. Application Data

(63) Continuation of application No. 14/716,467, filed on May 19, 2015, now Pat. No. 10,012,734.

(Continued)

(51) Int. Cl.
| | |
|---|---|
| *G01S 17/58* | (2006.01) |
| *G01S 17/08* | (2006.01) |
| *G01S 7/4913* | (2020.01) |
| *G06K 9/00* | (2006.01) |
| *G01S 17/42* | (2006.01) |

(Continued)

(52) U.S. Cl.
CPC ............ *G01S 17/58* (2013.01); *G01S 7/4913* (2013.01); *G01S 17/08* (2013.01); *G01S 17/42* (2013.01); *G01S 17/875* (2013.01); *G01S 17/89* (2013.01); *G06K 9/00255* (2013.01); *G06K 9/00261* (2013.01); *G01S 17/66* (2013.01)

(58) Field of Classification Search
None
See application file for complete search history.

(56) References Cited

U.S. PATENT DOCUMENTS

| | | |
|---|---|---|
| 5,781,295 A | 7/1998 | Fuchs et al. |
| 6,169,966 B1 | 1/2001 | Miura et al. |

(Continued)

FOREIGN PATENT DOCUMENTS

| | | | |
|---|---|---|---|
| CN | 1240270 A | * | 1/2000 |
| CN | 101435870 A | | 5/2009 |

(Continued)

OTHER PUBLICATIONS

English translation of CN1240270A4027 (Year: 2000).*

(Continued)

*Primary Examiner* — Charlie Y Peng
(74) *Attorney, Agent, or Firm* — Brake Hughes Bellermann LLP

(57) ABSTRACT

In one general aspect, a system for determining a motion of an object includes a laser system configured to generate range and velocity measurements of a plurality of points on the object and a processor. The processor is configured to determine, from the range and velocity measurements of the plurality of points on the object, a rotation of the object. In some aspects, the processor is also configured to determine, from the range and velocity measurements of the plurality of points on the object and the rotation of the object, a distance moved by the object between a first time and a second time.

20 Claims, 4 Drawing Sheets

Related U.S. Application Data

(60) Provisional application No. 62/030,988, filed on Jul. 30, 2014, provisional application No. 62/001,544, filed on May 21, 2014.

(51) Int. Cl.
*G01S 17/875* (2020.01)
*G01S 17/89* (2020.01)
*G01S 17/66* (2006.01)

(56) References Cited

U.S. PATENT DOCUMENTS

| | | | |
|---|---|---|---|
| 6,446,468 B1* | 9/2002 | Fleming, Jr. | C03B 37/01211 65/412 |
| 7,507,203 B2 | 3/2009 | Sebastian et al. | |
| 8,537,338 B1* | 9/2013 | Medasani | G01C 21/32 356/4.01 |
| 10,012,734 B2 | 7/2018 | Sebastian et al. | |
| 2007/0109177 A1 | 5/2007 | Baath et al. | |
| 2007/0150228 A1 | 6/2007 | Fukumoto et al. | |
| 2014/0049769 A1* | 2/2014 | Zheleznyak | G01S 17/89 356/28 |
| 2014/0064555 A1 | 3/2014 | Sebastian et al. | |
| 2015/0338518 A1 | 11/2015 | Sebastian et al. | |

FOREIGN PATENT DOCUMENTS

| | | |
|---|---|---|
| CN | 101437440 A | 5/2009 |
| CN | 101533529 A | 9/2009 |
| CN | 102378919 A | 3/2012 |
| JP | 2012518793 A | 8/2012 |
| WO | 2015179515 A1 | 11/2015 |

OTHER PUBLICATIONS

Office Action for Chinese Application No. 201580038606.7, dated Sep. 19, 2018, 9 pages.
Smith, et al., "Object Motion and Structure Recovery for Robotic Vision Using Scanning Laser Range Sensors", IEEE Transactions on Robotics and Automation, vol. 13, No. 1, Feb. 1997, pp. 74-80.
International Search Report and Written Opinion for International Application No. PCT/US15/31772, dated Aug. 20, 2015, 13 pages.
International Preliminary Report on Patentability for International Application No. PCT/US2015/31772, dated Dec. 1, 2016, 9 pages.
Office Action for Taiwanese Application No. 104116312, dated Oct. 15, 2018, 8 pages.
Office Action for Japanese Application No. 2016-568577, dated Apr. 23, 2019, 3 pages.
Communication pursuant to Article 94(3) EPC for European Application No. 15 727 200.6, dated Aug. 14, 2019, 6 pages.

* cited by examiner

DEVICES, SYSTEMS, AND METHODS FOR REAL TIME TRACKING OF AN OBJECT

RELATED APPLICATIONS

This application is a continuation of, and claims priority to, U.S. patent application Ser. No. 14/716,467, filed May 19, 2015, entitled "DEVICES, SYSTEMS, AND METHODS FOR REAL TIME TRACKING OF AN OBJECT," which claims the benefit of U.S. Provisional Patent Application No. 62/030,988, filed on Jul. 30, 2014, entitled "DEVICES, SYSTEMS, AND METHODS FOR REAL TIME TRACKING OF AN OBJECT," and U.S. Provisional Patent Application No. 62/001,544, filed May 21, 2014, entitled "DEVICES, SYSTEMS, AND METHODS FOR REAL TIME TRACKING OF AN OBJECT," each of which is incorporated by reference herein in its entirety.

TECHNICAL FIELD

This description relates to systems and methods for tracking an object.

BACKGROUND

In some known systems, objects may be tracked using a laser Light Detection And Ranging (LIDAR) system in conjunction with a video system. Some such known systems may be complex and difficult to use. Additionally, in some such known systems, the video system may require light in order to detect the object to be tracked. Thus, a need exists for systems, methods, and apparatus to address the shortfalls of present technology and to provide other new and innovative features.

SUMMARY

In one general aspect, a system for determining a motion of an object includes a laser system configured to generate range and velocity measurements of a plurality of points on the object and a processor. The processor is configured to determine, from the range and velocity measurements of the plurality of points on the object, a rotation of the object. In some aspects, the processor is also configured to determine, from the range and velocity measurements of the plurality of points on the object and the rotation of the object, a distance and direction moved by the object between a first time and a second time. In some implementations, the processor is configured to determine, from the range and velocity measurements of the plurality of points on the object, a distance and direction moved by the object between a first time and a second time in a direction orthogonal to a laser beam emitted by the laser system. In some implementations, the object is an object that has a rigid body.

In another general aspect, a non-transitory computer-readable storage medium storing instructions that when executed cause one or more processors to perform a process, the process comprising generating range and velocity measurements of a plurality of points on an object; and determining, from the range and velocity measurements of the plurality of points on the object, a rotation of the object. In some implementations, the process includes determining a distance and direction moved by the object between the first time and the second time.

In another general aspect, a method includes generating range and velocity measurements of a plurality of points on an object; and determining, from the range and velocity measurements of the plurality of points on the object, a rotation of the object. In some implementations, the method includes determining a distance and direction moved by the object between the first time and the second time.

DETAILED DESCRIPTION

Figure 1:
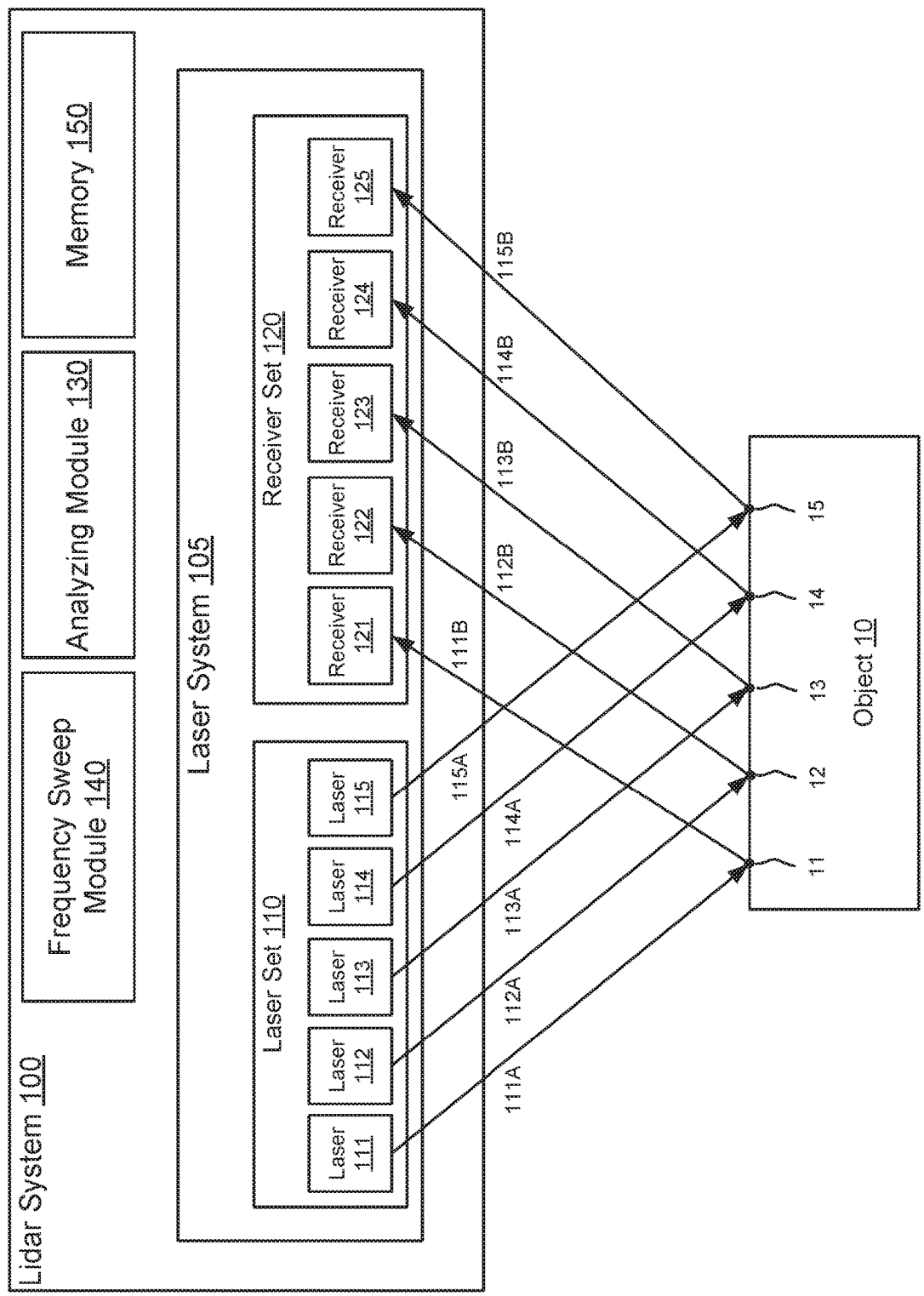
FIG. 1 is a schematic diagram that illustrates a LIDAR system according to an implementation.

FIG. 1 is a diagram that schematically illustrates a LIDAR system 100 according to an aspect of the invention. The LIDAR system 100 includes a laser system 105 and an analyzing module 130. The laser system 105 includes a laser set 110 and a receiver set 120.

The LIDAR system 100 is configured to track an object 10. For example, in some implementations, the LIDAR system 100 is configured to track the object 10 from time T1 to time T2. In some implementations, the LIDAR system 100 is configured to determine a rotation of the object 10 about an axis between time T1 and time T2. In some implementations, the LIDAR system 100 is configured to determine a rotation of the object 10 about at least two different axes. For example, in some implementations, the LIDAR system 100 is configured to determine a rotation of the object about at least two different axes that are perpendicular or orthogonal to one another between time T1 and time T2. In some implementations, the LIDAR system 100 is configured to determine a rotation of the object in the dark (or without the object being disposed within a light source such that the object is visible to the human eye). For example, in some implementations, the LIDAR system 100 is configured to determine a rotation of the object while the object is in a light field of less than 10 lumens.

In some implementations, the LIDAR system 100 is also configured to determine the movement of the object 10 between the time T1 and the time T2. For example, in some implementations, the LIDAR system 100 is configured to determine movement of an object 10 between time T1 and time T2 within a plane, such as an x-y plane. In some implementations, the LIDAR system 100 is configured to determine a rotation of the object in the dark (or without the object being disposed within a light source such that the object is visible to the human eye).

The object 10 may be of any shape or form. For example, in some implementations, the object 10 is a rigid, solid object. In some implementations, the object 10 is a human subject or individual or a portion of a body of a human subject or individual such as a head or a face of the human subject or individual. In some implementations, the object 10 can be referred to as a target or as a target object.

The LIDAR system 100 is configured to use the laser system 105 and the analyzing module 130 to produce or measure a range (or range estimates) and/or a velocity (or velocity estimate) of the object 10 that can be stationary or moving with respect to the LIDAR system 100. For example, in some implementations, the velocity that is produced or measured is the velocity in the direction of the radiation beam (as described in more detail below). In other words, the velocity that is measured is the velocity of the object towards or away from the LIDAR system 100. In some implementations, the range can be a range estimate and the velocity can be a velocity estimate. In some implementations the range can be an accurate range estimate and the velocity can be an accurate velocity estimate. In some implementations, the LIDAR system 100 is configured to produce accurate range estimates and/or accurate velocity estimates despite, for example, multipath effects associated with electromagnetic radiation from the lasers 110 and/or other interference that can arise during measurements.

In some implementations, the LIDAR system 100 is configured to use the laser system 105 and the analyzing module 130 to produce or measure a range and/or a velocity of various different points on the object 10. For example, in the illustrated implementation, the LIDAR system 100 is configured to produce or measure a range and/or a velocity of five points (or locations) 11, 12, 13, 14, and 15 on the object 10. In other implementations, the LIDAR system 100 is configured to produce or measure, at any given time, a range and/or a velocity of more than five points on the object. For example, the LIDAR system 100 may be configured to produce or measure a range and/or a velocity of sixteen points or more than sixteen points on the object.

The laser system 105 of the LIDAR system 100 includes a laser set 110. In the illustrated implementation, the laser set 110 is configured to emit or direct laser beams 111A, 112A, 113A, 114A, and 115A. In other implementations, the laser set 110 is configured to emit or direct less than 5 laser beams. For example, in one implementation, the laser set 110 is configured to emit or direct 4 laser beams. In yet other implementation, the laser set 110 is configured to emit between 4 and 16 laser beams. In further implementations, the laser set is configured to emit or direct more than 16 laser beams.

In the illustrated implementation, the laser set 110 includes lasers 111, 112, 113, 114, and 115 to emit or direct the laser beams. In other implementations, a single laser may be used to emit or direct the laser beams 111A, 112A, 113A, 114A, and 115A. In other implementations, the laser set 110 includes more or less than five lasers. For example, in some implementations, the laser set 110 includes at least 5 lasers. In other implementations, the laser set 110 includes at least 4 lasers. In other implementations, the laser set 110 includes between 5 and 16 lasers. In other implementations, the laser set 110 includes between 4 and 16 lasers. In yet other implementations, the set 110 includes more than 16 lasers.

Each of the lasers 111, 112, 113, 114, and 115 are configured to emit (e.g., produce, propagate) electromagnetic radiation at one or more frequencies that can be, for example, a coherent light emission (e.g., monochromatic light emission) or beam. In some implementations, the lasers are configured to emit (e.g., produce, propagate) a plurality of a coherent light emissions (e.g., monochromatic light emissions) or beams. The emissions from the lasers may be referred to as an electromagnetic radiation emission, as emitted electromagnetic radiation, or as transmitted electromagnetic radiation.

Specifically, each of the lasers of the laser system 105 is configured to emit (e.g., produce, propagate) a coherent light emission (e.g., monochromatic light emission) or beam from the LIDAR system 100 towards a point on the object 10. In some implementations, each of the lasers of the laser system 105 is configured to emit a light beam towards a different point on the object 10. In some implementations, the lasers of the laser system 105 of the laser system 105 are configured to emit or direct more than one light beam towards the object 10. For example, a single laser may be used to emit or direct a plurality (such as 4, 5, or more than 5) light beams towards different points on the object 10.

In the illustrated implementation, laser 111 is configured to emit light or electromagnetic radiation beam 111A towards point 11 on object 10. Laser 112 is configured to emit light or electromagnetic radiation beam 112A towards point 12 on object 10. Laser 113 is configured to emit light or electromagnetic radiation beam 113A towards point 13 on object 10. Laser 114 is configured to emit light or electromagnetic radiation beam 114A towards point 14 on object 10. Laser 115 is configured to emit light or electromagnetic radiation beam 115A towards point 15 on object 10.

The LIDAR system 100 may be any type of system that is configured to detect range and velocity of an object.

The laser system 105 of the LIDAR system 100 includes a receiver set 120. In the illustrated implementation, the receiver set 120 includes receiver 121, 122, 123, 124, and 125. In other implementations, the receiver set 120 includes more or less than five receivers. For example, in some implementations, the receiver set 120 includes at least 5 receivers. In other implementations, the receiver set 120 includes between 5 and 16 receivers. In yet other implementations, the receiver set 120 includes more than 16 receivers. In some implementations, the receiver set 120 includes a receiver for each laser in the laser set 110. In some implementations, the receiver set 120 includes a receiver for each laser beam that is emitted by the laser set 110. In some implementations, the receiver set 120 includes a receiver for each laser beam that is emitted by each laser of laser set 110. In some implementations, the receiver set 120 includes a receiver for each point or measurement location on the object 10 that is being observed.

Each of the receivers 121, 122, 123, 124, and 125 are configured to receive electromagnetic radiation reflected (also can be referred to as reflected electromagnetic radiation) from the object 10 in response to electromagnetic radiation emitted from the lasers toward the object 10. For example, in the illustrated implementation, receiver 121 is configured to receive electromagnetic radiation 111B that is reflected from point 11 of object 10. Receiver 122 is configured to receive electromagnetic radiation beam 112B that is reflected from point 12 of object 10. Receiver 123 is configured to receive electromagnetic radiation beam 113B that is reflected from point 13 of object 10. Receiver 124 is configured to receive electromagnetic radiation beam 114B that is reflected from point 14 of object 10. Receiver 125 is configured to receive electromagnetic radiation beam 115B that is reflected from point 15 of object 10.

The analyzing module 130 of the LIDAR system 100 is configured to analyze a combination of emitted electromagnetic radiation (e.g., emitted electromagnetic radiation beams 111A through 115A) from each of the lasers and reflected electromagnetic radiation (e.g., reflected electromagnetic radiation 111B through 115B) received by the each of the receivers. The emitted electromagnetic radiation can be emitted in accordance with a pattern including an up-chirp followed by a down-chirp (or a down-chirp followed by an up-chirp). The combination of a frequency of the emitted electromagnetic radiation from each of the lasers and a frequency of the reflected electromagnetic radiation received by the receivers can be analyzed by the analyzing module 130 to determine the range (distance from the LIDAR system) and velocity of each observed point of the object 10. Specifically, in the illustrated implementation, the LIDAR system 100 is configured to determine the range and/or the velocity for each of the points 11, 12, 13, 14, and 15 of object 10 from a first time T1 to a second time T2.

In some implementations, the LIDAR system 100 is configured to track, observe, or otherwise monitor each point 11, 12, 13, 14, and 15 on the object 10 about 100 times per second. In such implementations, the time difference between T1 and T2 is about 0.01 seconds. In other implementations, the LIDAR system 100 is configured to track or observe each point more frequently than 100 times per second, such as 1000 times per second or more. In some implementations, the LIDAR system 100 is configured to track or observe each point less than 100 times per second.

As will be discussed in more detail below, the analyzing module 130 is also configured to determine the rotation of the object and the distance and direction moved by the object between time T1 and time T2.

Figure 2:
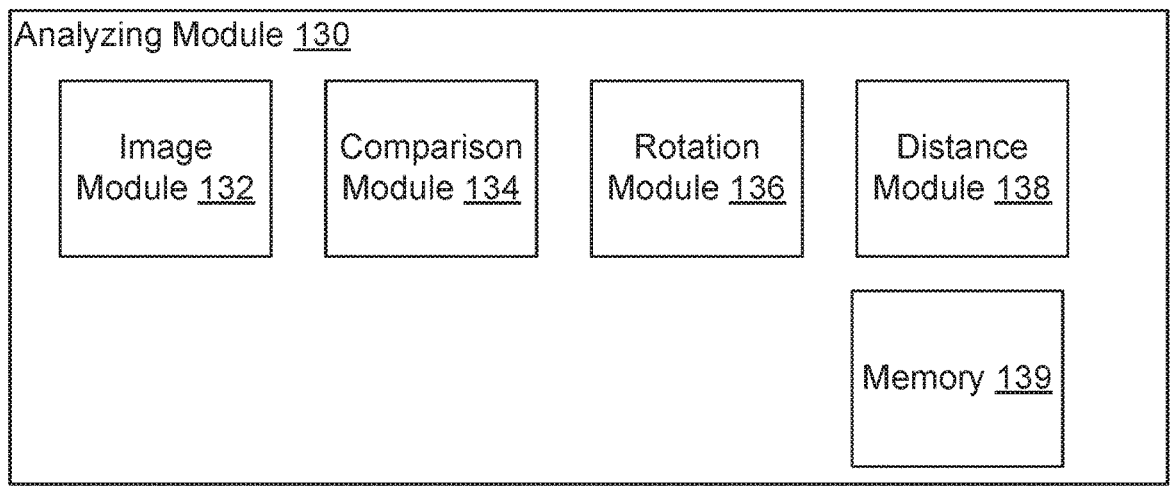
FIG. 2 is a schematic diagram that illustrates an example processor according to an implementation.

FIG. 2 is a schematic diagram of the analyzing module 130. The analyzing module 130 includes an image module 132, a comparison module 134, a rotation module 136, and a distance module 138. The image module 132 is configured to acquire a three-dimensional image of the object 10. In some cases, the object 10 is a known object or subject, such as a known person. In such cases, the object 10 has a known three-dimensional structure and the image module 132 can acquire the structure from a database, a memory, or from any other storage device or memory device 139. In some implementations, the three-dimensional structure of the object may be provided to the image module 132 from the database, memory, or other storage or memory device 139. In some implementations, the database, memory, or other storage device is local to the analyzing module 130. In other implementations, the three-dimensional structure may be received by the analyzing module 130 from a remote storage device, such as via the internet or an intranet.

In some cases, the object 10 does not have a known three-dimensional structure. In such cases, the image module 132 is configured to create a three-dimensional structure of the object using data received from the laser system 110. For example, the image module 132 may create the three-dimensional structure of the object 10 (or a three-dimensional structure of a portion of the object 10) using the range data produced by, for example, the laser system 105.

The comparison module 134 is configured to determine the range and/or the velocity of the object 10. More specifically, the comparison module 134 is configured to determine the range and/or the velocity of various points (such as 11, 12, 13, 14, and 15) of the object 10. As described above, in one implementation, the comparison module 134 is configured to analyze a combination of emitted electromagnetic radiation from each of the lasers and reflected electromagnetic radiation received by the each of the receivers to determine the range and/or the velocity for points 11, 12, 13, 14, and 15 of object 10 from a first time T1 to a second time T2.

The rotation module 136 is configured to determine a rotation of the object 10. In some implementations, the rotation module 136 is configured to determine a rotation of the object 10 about more than one axis. For example, in some implementations, the rotational module 136 is configured to determine the rotation of the object 10 about two axes that are non-parallel (e.g., orthogonal) to each other. For example, in one implementation, the laser system is configured to emit radiation towards the object 10 along an axis (Z axis) and the rotation module 136 is configured to determine the rotation of the object about a first axis that is orthogonal to the Z axis (the X axis) and a second axis that is orthogonal to the Z axis (the Y axis). In some implementations, the rotation module 136 is configured to determine the amount of rotation of the object between a first time T1 and a second time T2.

In some implantations, for a rigid solid object, the velocity field component in one Cartesian direction, will vary linearly in the spatial coordinates orthogonal to that direction. Also, there will be no variation of that component in the spatial direction of the component. For example, consider the velocity component in the z-direction, Vz. At any given time there can be no variation of Vz in the z direction or the object would be stretching, violating the definition of a rigid solid body. If one investigates the trigonometry/vector analysis of z motions caused by the rotational components Wx, Wy, and Wz, one sees that, for each rotational component, the motion Vz may be described by a linear equation:

$$Vz = Vz(x, y) = A*x + B*y + C,$$

where A, B and C are constants at a given time.
where,
  A=−Wy,
  B=Wx, and
  C depends on the location of the origin of the coordinate system.
Wz imparts no z-component of velocity.

Therefore, at a given time, if the velocity Vz at a number of (x, y) positions (for example, a number of points on the object 10) are measures, then the values Wx, Wy, and the translational constant velocity C=Vz0 may be solved for with a set of linear equations. In some implementations, there are enough spatial (x, y) points that the linear equation are substantially over determined.

The distance module 138 is configured to determine how far the object 10 has traveled in the x-y plane. For example, in some implementations, the distance module 138 is configured to determine how far the object 10 has traveled between time T1 and time T2 within an x-y plane that is orthogonal to the z axis (the axis of the radiation beams of the laser system 105).

In some implementations, with object orientation known, the slopes dz/dx and dz/dy are known as a function of (x, y) position on the object. The array of LIDAR range values (as determined by the laser system 105) may be used to determine the slope pair (dz/dx, dz/dy) at a number of points (x, y). For example, in some implementations, a slope and/or curvature of the surface of the object may be determined in each of the x direction and the y direction to acquire slope and/or curvature gradients. For some surfaces, object orientation information, plus a slope pair uniquely determine a position on the surface of the object. For example, for a complex surface, such as a face of a person or individual, a slope pair will likely determine a location uniquely in a local region even though the same slope pair may be found more than once on the whole face. In some implementations, a plurality of slope pairs will estimate position redundantly and can be used to reduce error in position estimation from noisy range data.

With absolute LIDAR beam positions on the object estimated from slope pairs and a current rotated object model available, the distance module 138 may determine the position change of the object 10. For example, the rotation of the object (as determined or calculated) may be reversed, removed, or backed out (such that the object is returned to its original orientation). A determination of the beam position change necessary to restore the beams to their desired location may also be made. The translational velocity (dx/dt, dy/dt) may then be determined using the position location data of the object. In some implementations, with the target rotational and translational velocities known, beam relocation can be done so that beam motion is smooth and beam location is close to the desired position at future points in time.

In some implementations, a relatively small number of beam points may be necessary to maintain position without scanning. In some implementations, the position may be maintained without scanning and the LIDAR system may be used to monitor vibrations.

The components (e.g., modules, processors (e.g., a processor defined within a substrate such as a silicon substrate)) of the LIDAR system 100 (e.g., the analyzing module 130) can be configured to operate based on one or more platforms (e.g., one or more similar or different platforms) that can include one or more types of hardware, software, firmware, operating systems, runtime libraries, and/or so forth. In some implementations, the components of the LIDAR system 100 can be configured to operate within a cluster of devices (e.g., a server farm).

In some implementations, one or more portions of the components shown in the LIDAR system 100 in FIGS. 1 and/or FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 100 can be, or can include, a software module configured for execution by at least one processor (not shown). In some implementations, the functionality of the components can be included in different modules and/or different components than those shown in FIGS. 1 and/or FIG. 2.

In some implementations, one or more of the components of the LIDAR system 100 can be, or can include, processors configured to process instructions stored in a memory. For example, the analyzing module 130 (and/or a portion thereof) can be a combination of a processor and a memory configured to execute instructions related to a process to implement one or more functions.

Although not shown, in some implementations, the components of the LIDAR system 100 (or portions thereof) can be configured to operate within, for example, a data center (e.g., a cloud computing environment), a computer system, one or more server/host devices, and/or so forth. In some implementations, the components of the LIDAR system 100 (or portions thereof) can be configured to operate within a network. Thus, the LIDAR system 100 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the LIDAR system 100 may include a memory. The memory can be any type of memory such as a random-access memory, a disk drive memory, flash memory, and/or so forth. In some implementations, the memory can be implemented as more than one memory component (e.g., more than one RAM component or disk drive memory) associated with the components of the LIDAR system 100.

Figure 3:
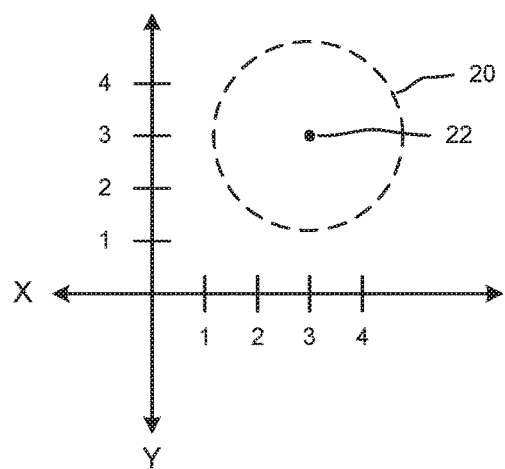
FIGS. 3 and 4 illustrate an object that may be tracked according to an implementation.
Figure 4:
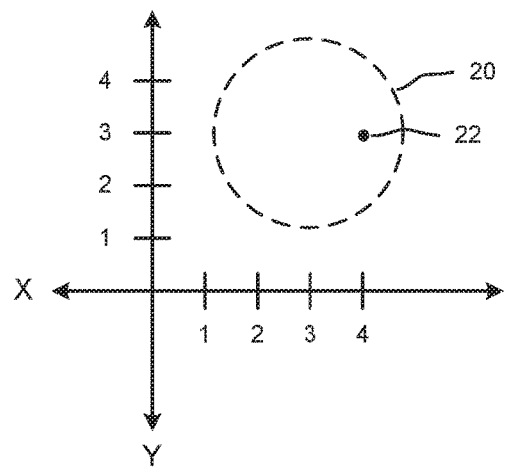

As best illustrated in FIGS. 3 and 4, in one implementation, an object 20 may be observed by (e.g., targeted by) the LIDAR system 100. The object 20 may have any shape, but is represented in FIGS. 3 and 4 as a circle. In FIG. 3, at time T1 a point 22 on the object 20 is being observed by the LIDAR system 100. At time T1 the point 22 is located at (3,3) in the x,y plane. As illustrated in FIG. 4, at time T2 the point 22 is located at (4,3) in the x,y plane. The movement of the point may be the result of different types of movements of the object 20. For example, the object 20 may have moved from one location to another (translational movement) or the object 20 may have rotated (for example, about an axis parallel to the y axis of the x-y plane).

Figure 5:
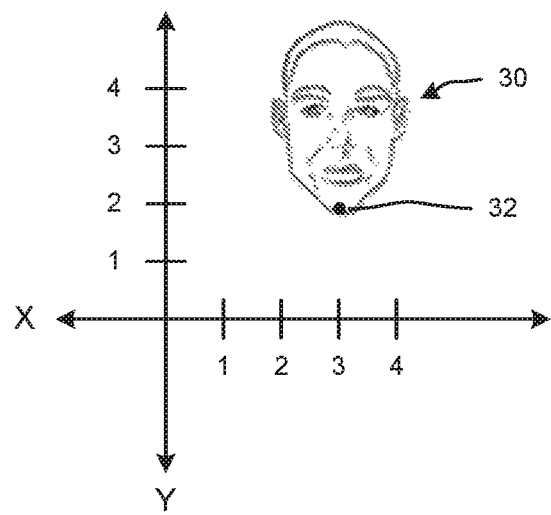
FIGS. 5 through 7 illustrate another object that may be tracked according to an implementation.
Figure 6:
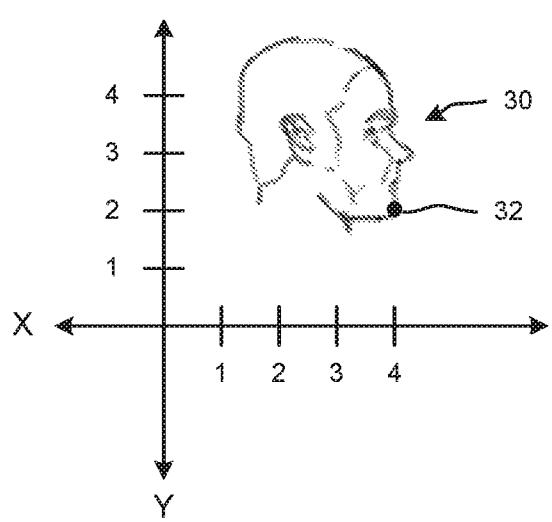
Figure 7:
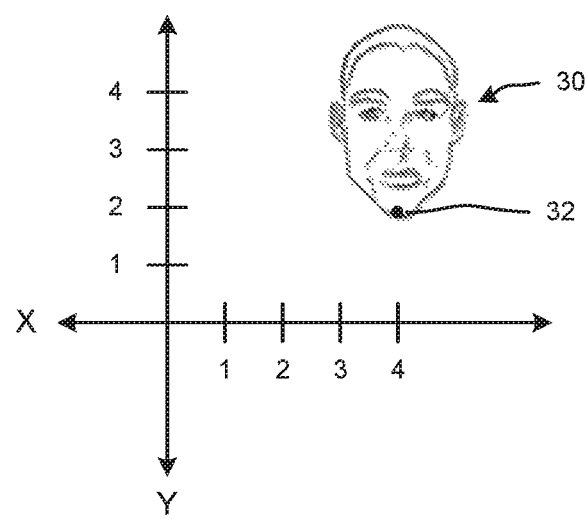

As illustrated in FIGS. 5, 6, and 7 a head or face 30 of an individual may be tracked or observed by the LIDAR system 100. Specifically, a point or location 32 of the head or face 30 may be observed. As illustrated in FIG. 5, at time T1 the point 32 is located at (3,2) in the x-y plane. At time T2 the point 32 may be observed to be at (4,2). The movement of the point may be the result of different types of motion. For example, the person or individual may have rotated their head (for example, about an axis parallel to the y axis), as illustrated in FIG. 6. Alternatively, the person or individual may have moved their head (without any rotation), as illustrated in FIG. 7.

As described above, by observing the range and velocity of several points on the object, the rotation module 136 is configured to determine the rotations of the object. Once the rotation of the object is known, as describe above, the distance module 138 is configured to determine how far the object has moved in the x-y plane. Accordingly, in one implementation, the LIDAR system 100 is configured to determine if a person's face or head is oriented as illustrated in FIG. 6 at time T2 or as illustrated in FIG. 7 at time T2.

Figure 8:
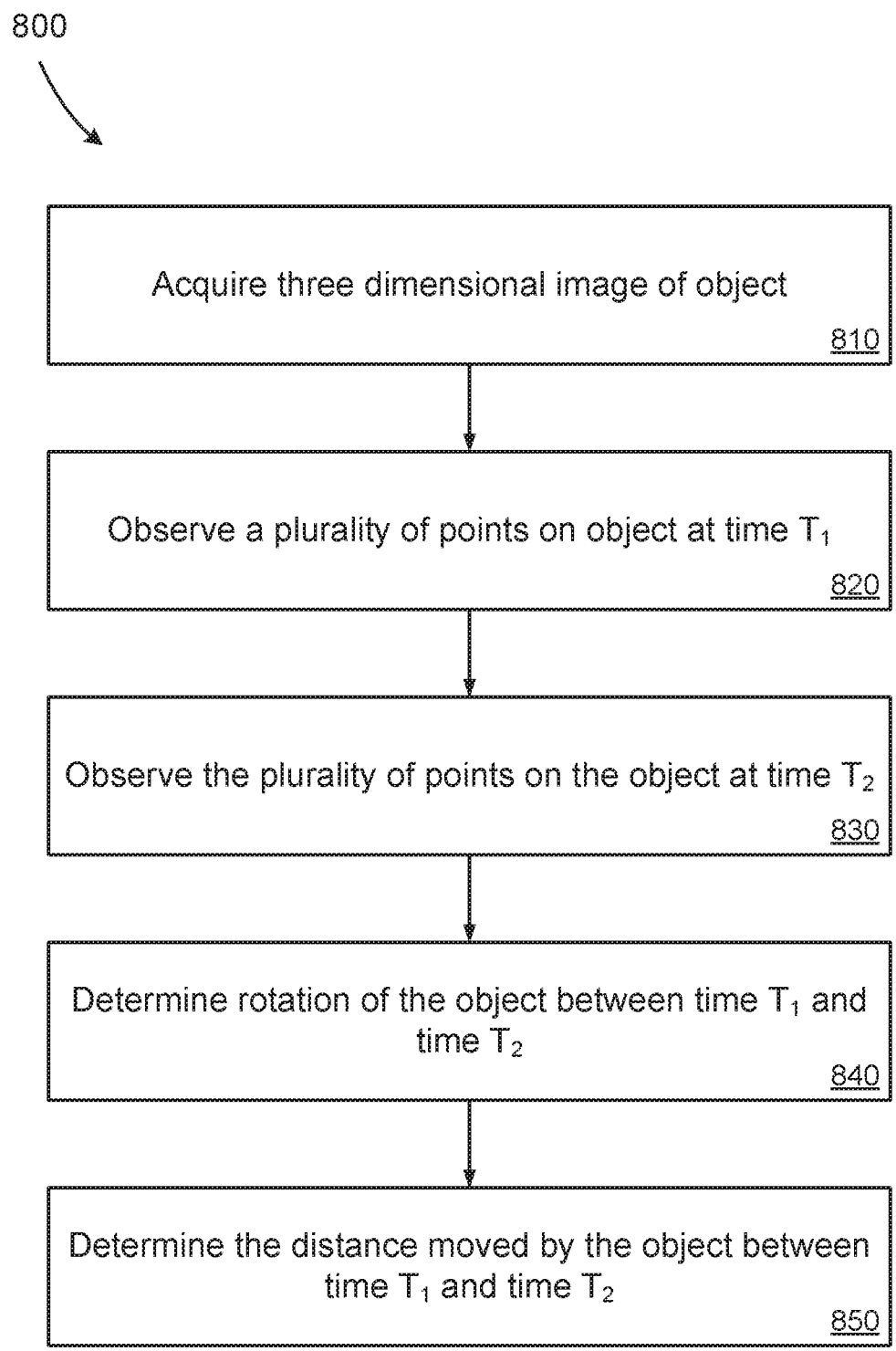
FIG. 8 is a flow chart that illustrates a method of tracking an object according to an implementation.

FIG. 8 is a flow chart of a method 800 according to an implementation of the invention. The method 800 may be used to determine the rotation and/or motion (or distance moved) by an object between a first time T1 and a second time T2. The method 800 may be used many times consecutively to determine the rotation or motion of an object over a long period of time. For example, the method may be used hundreds of times a second to track or monitor an object.

At 810, a three-dimensional image of the object is acquired. For example, in some implementations, an image module, such as image module 132, may acquire the three-dimensional image of the object (if the object is a known object) from a database or other resource. In other implementations, the image module 132 may acquire the three-dimensional image of the object (or a portion of the object) by using scanning information from the laser system 105 to develop a three-dimensional image of the object (or a portion of the object).

At 820, a plurality of points on the object are observed at a first time T1. For example, in some implementations, the laser system 105 may observe and detect a range and/or a velocity of each of the plurality of points on the object. For example, in some implementations, five points on the object are observed at any given time. In other implementations, more than five points are observed. For example, between 5 and 16 points may be observed. In other implementations, more than 16 points are observed.

As discussed above, the laser system 105 may observe the plurality of points by emitting beams of radiation and receiving the reflection of such radiation by each of the plurality of points on the object. As discussed above, a comparison of the emitted radiation and the reflected radiation may provide the range and/or velocity in the z direction (the direction of the radiation beam) of the object.

At 830, the plurality of points (or points that are substantially located at the same location as the plurality of points) are observed at a second time T2. In some implementations, the same points on the object are identified by an analysis or comparison of the three-dimensional image (either the known or system developed three-dimensional image). The second time T2 is different than the first time T1. In some implementations, the second time T2 is later in time than the first time T1. The plurality of points may be observed by the laser system 105 as described above.

At 840, the rotation of the object between the time T1 and the time T2 is determined. For example, in some implementations, as described above a rotation module 136 may be configured to analyze the range and velocity information and determine the rotation of the object. In some implementations, the rotation of the object about one axis is determined. In some implementations, the rotation of the object about at least two axes that are orthogonal to each other are determined. Is some implementations, the rotation of the object about two axis that are orthogonal to the z axis (the direction or axis of the beam of radiation) is determined.

At 850, the distance and/or direction moved by the object between time T1 and time T2 is determined. For example, in some implementations, the motion of the object in an x-y plane that is orthogonal to the z axis (the axis of the beam of radiation) is determined. As described above, the distance module 138 may determine the motion or distance moved by the object in the x-y plane through the rotation determination and the slope of the portion of the object that is being observed. Specifically, the unique portion of the object that is being observed may be identified by the slope or a slope analysis of the object. The location of the portion of the object may be specified. The location of the point or location along with the rotation data may result in a determination or motion of the object in the x-y plane. In some implementations, the rotation that is determined or observed may be backed out or removed such that the object is disposed in the same orientation at T2 as it was at T1. The uniquely identified points on the object may then be identified and it can be determined how far such points have moved in the x-y plane (for example, how far in the x direction and how far in the y direction). In some embodiments, closely-spaced LIDAR beams with a repeated scan cycle may be used to detect target motion normal to beam direction. If the beams are close enough, the range to the surface may be approximated as a linear function of the distance between the beams. As discussed in detail above, the position of the object or target 10 is already corrected for Vz (velocity in the z direction), Wx (rotation about the x axis) and Wy (rotation about the y axis) motion using multi point lidar information, motion due to Vx, Vy, and Wz may be determined. As discussed in detail below, each of those motions may be determined separately.

In some implementations, a LIDAR system includes a laser system that includes lasers or laser beams that are configured to move in a pattern or patterns with respect to the object that is being tracked. For example, in some implementations, the laser system 105 of the LIDAR system 100 includes a plurality of lasers or beams that are configured to move in a pattern or patterns with respect to the object being tracked.

For example, in some implementations, the LIDAR system 100 may have one mode in which the laser beams are fixed or stationary and a second mode in which the laser beams move in a pattern or patterns such as a shape. In some implementations, two or more of the laser beams move in a pattern or patterns when the LIDAR system is in the second mode. In some implementations, different laser beams may move independently in different patterns.

In other implementations, the LIDAR system 100 includes some lasers or produces some laser beams that are stationary and some that are configured to move in a pattern (or patterns) or shape.

The lasers or beams can move in any pattern or shape. For example, in some implementations, the lasers or beams are configured to move in elliptical shape. In other implementations, the lasers or beams are configured to move in a line, circle, square, rectangle, triangle, or any other shape. In some implementations, the shape or pattern that the lasers or beams move in are dictated or determined by the object that is being tracked. For example, in some implementations, the pattern or shape of the laser movement may be similar to the shape of the object that is being tracked. For example, an elliptical shape or pattern may be used when tracking a face of an individual as the face of an individual is generally elliptical in shape. Additionally, in some implementations, the lasers or beams are configured to move with or follow the object that is being tracked. In such implementations, the lasers or beams may be directed in a slightly different direction to follow or account for the movement of the object being tracked.

In some implementations, the analyzing module 130 (such as the distance module 138 of the analyzing module 130) is configured to determine the distance moved and/or the velocity of the object 10. For example, the analyzing module 130 may determine or calculate the distance moved by the object in directions normal or orthogonal to the direction of the laser beam motion.

In one implementation, while the laser beams are moving in one direction along their pattern or shape, the analyzing module 130 is configured to detect motion (distance and/or velocity) of the object 10 in a direction parallel to the direction that the laser beams are moving and in a direction perpendicular to the direction that the beams are moving. In some embodiments, the analyzing module 130 is also configured to detect or determine rotation of the object about an axis parallel to the laser beams (the Z direction).

In some implementations, the laser beams that are moving along a pattern or shape are disposed on or hit the target at a very small distance from each other. In other words, the beams are closely-spaced. In some implementations, the beams are less than a few centimeters from each other. In other implementations, the beams are less than a few millimeters from each other.

The velocity of the object 10 in an x direction (Vx or also referred to as vx) may be determined as follows. The plurality of points measured during the time period are used to calculate and remove object motion in z, Wx and Wy, as described above. A pair of LIDAR (or laser) beams are in a repeated scan pattern, with index (k), (an ellipse, for example) there will be a portion of the scan cycle in which most of the motion of the beams is mostly in the y-direction. In some implementations, the two beams have the same pointing device which, at a given range, will maintain approximately the same lateral separation $\Delta x$ and will have, at a given time, approximately the same vertical y position (y1≈y2≈y). The range of the target and lateral position of the beam are sampled with index (j). For each of the two beams the series of measured points (x1(j), y1(j), z1(j)) and (x2(j), y2(j), z2(j)) is sampling a surface z(x, y). If the slope of the target surface is approximated as linear, this slope dz/dx is measured at each y as:

$$dz/dx(j)=dz/dx(y(j))=(z2(j)-(z1(j))/(x2(j)-x1(j))=(z2(j)-z1(j))/\Delta x.$$

On a subsequent scan cycle the beam will revisit each y position at approximately the same delay Tcycle from the time of its previous visit to that y position. On a repeated scan cycle the target may have moved in the x-direction. If the target moves a distance δx=vx* Tcycle during the cycle period, we will have $$z1(y, k+1)=z1(y, k)-dz/dx(y, k)*\delta x, \text{ or}$$

$$[z1(y, k+1)-z1(y, k)]*[x2(y, k)-x1(y, k)]=-[z2(y, k)-z1(y, k)]*\delta x$$

At each delay Tcycle there is an estimated error, e, for each sample (j) in cycle (k):

$$ex(j)=[z1(y(m), k+1)-z1(y(j), k)]*[x2(y(j), k)-x1(y(j), k)]+[z2(y(j), k)-z1(y(j), k)]* \delta x(1, j),$$

where y(m) is the sample in cycle (k+1) with the value closest to y(j) in cycle (k). In some implementations, it is desirable to minimize the error Ex=sum (ex(j)*ex(j)). Accordingly, in some cases, the delay Tcycle that corresponds or correlates to the least amount of error may be selected and used.

Alternatively, z1(y, k+1) may be an interpolated value using z1(y(m), k+1) and z1(y(m±1, k+1). If we assume that Tcycle is approximately constant over the set of paired samples j and m and that there is no appreciable acceleration (or change in velocity) in the x direction (for example, because the Tcycle is a very short time period), then δx will be constant for the various j and m pairs and we can implement a standard least-squares solution for δx. In other implementations, a different solution for δx may be used. The following solution results.

$$A_x = \delta x/\Delta x = \frac{\text{sum}([z1(y(m), k+1)-z1(y(j), k)]*[z2(y(j), k)-z1(yj(j), k)])}{\text{sum}([z2(y(j), k)-z1(y(j), k)]*([z2(y(j), k)-z1(y(j), k)])}$$

Then, vx=δx/Tcycle=Ax*δx/Tcycle

We can also make the approximation that the x component of the object or target velocity, vx, is constant for a scan cycle. If this approximation does not hold we can introduce an acceleration term ax, so that $$vx=vx(0)+ax*Tcycle$$

and solve for both vx0 and ax.

If the beam moves an x-distance ΔXbeam between scan cycles, this beam offset may be corrected for by adjusting the z value in the subsequent scan cycle for the beam position change to obtain the measurement that would have been made at the (x(j), y(j)) position of the previous scan cycle $$z1\text{adjusted}(y(m), k+1)=z1(y(m), k+1)-dz/dx(y(j), k)*\Delta X\text{beam}.$$

With this adjustment made, the least squares solution for vx proceeds as before.

Similarly, velocity in the y direction (Vy or also referred to as vy) may be determined as follows. There will be a portion of the scan cycle in which most of the motion of the beams is mostly in the x-direction. During such scan cycle segment in the x direction we can minimize the error $$Ey=\text{sum }(ey(j)*ey(j)), \text{ where}$$

$$ey(j)=z1(y(j)-vy*Tcycle, k)-z1(y(m), k+1).$$

In some cases this approach may work well even if there is a progressive line scan because of the similarity in surface shape for closely-spaced scan lines.

Rotation about the Z axis (Wz or also referred to as ωz) may be determined because it will introduce a linear gradient in the observed value of vx and vy that occur for each scan cycle. A non-zero value of wz will result in a line gradient of vx as a function of y and vy as a function of x. Additional terms can be added to the least squares solutions for vx and vy to obtain also wz. Also, multiple beams may be may be used in the determination. For example, a solution for vy may be determined at different x values, using the method above, the gradient of vy with x yields ωz:

$$vy2=vy1-\omega z*(x2-x1).$$

$$A\omega z=(vy2-vy1)/(x2-x1).$$

In some implementations, calculations or determinations may be made when the Tcycle is not constant. Additionally, in some cases, calculations or determinations may be made when the beam spacing is not constant or consistent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In some implementations, the LIDAR system may achieve millimeter range accuracy performance off moving faces of a subject or individual. However, in some implementations, solid object velocity estimation requires processing of multiples samples in order to remove significant velocity components from speech and other biological components. A 500 Hz vibration with an amplitude of 0.05 mm (50 microns) will have a maximum velocity of (2*pi*500*5E−5=0.157 m/sec) about 16 cm/sec. Even though the amplitude of the vibration is an insignificant range change for the process of tracking faces of a subject or individual, the instantaneous velocity may be significant and the vibrational velocity may be removed. In some implementations, removing vibrational velocity may require processing a velocity data sample significantly longer than the periods of the vibrations to be removed and care to avoid noise or bias. For example, noise in the velocity (for example, velocity in the Z direction) can effect or degrade the ability to detect or determine the rotation of the object or the Z velocity of the object. In some implementations, the vibration or velocity noise is relatively small and can be averaged out to remove its effects.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system for determining a motion of an object, comprising:
    a laser system configured to generate a plurality of range measurement and a velocity measurement for a plurality of points on the object; and
    an analyzing module configured to:
        determine, from the range and velocity measurements of the plurality of points on the object, a rotation of the object between a first time and a second time,
        determine, from the plurality of range measurements, a plurality of slope pairs at the first time, each of the plurality of slope pairs corresponding a respective point of the plurality of points on the object;
        generate, from plurality of slope pairs, absolute positions of the plurality of points on the object at the first time; and
        determine, from the absolute positions of the plurality of points on the object at the first time and the rotation of the object between the first time and the second time, a change in the position of the object between the first time and the second time in a direction orthogonal to a direction of the plurality of range measurements.

2. The system as in claim 1, wherein the analyzing module configured to determine the change in the position of the object between the first time and the second time in the direction orthogonal to the direction of the plurality of range measurements is further configured to:
    generate an error metric based on the absolute positions of the plurality of points on the object at the first time, a position of the plurality of points on the object at the second time, and an unknown change in position; and
    perform a minimization operation on the error metric over the unknown change in position to produce the change in the position of the object between the first time and the second time.

3. The system as in claim 2, wherein the analyzer configured to generate the error metric is further configured to:
    produce, as the positions of the plurality of points on the object at the second time, the positions of the points closest to the plurality of points on the object at the first time.

4. The system as in claim 2, wherein the analyzer configured to generate the error metric is further configured to:
    generate a component of a position of a first point of the plurality of points in the direction of the plurality of range measurements at the second time based on the component of the position of the point along the laser beam at the first time and a slope of the slope pair corresponding to the position of the first point; and
    generate a difference between the position of the point in the direction of the plurality of range measurements at the second time and the position of the point along the laser beam at the first time.

5. The system as in claim 4, wherein the point is a first point, and
    wherein the analyzer configured to generate the error metric is further configured to:
        generate a product of (i) the difference between the position of the first point in the direction of the plurality of range measurements at the second time and the position of the first point in the direction of the plurality of range measurements at the first time, and (ii) a difference between a position of the first point in a direction normal to the plurality of range measurements at the first time and a position of a second point in the direction normal to the plurality of range measurements at the first time.

6. The system as in claim 2, wherein the analyzer configured to perform the minimization operation on the error metric over the unknown change in position is further configured to:
    perform an interpolation operation on a component of a position of a third point and a fourth point of the plurality of points in the direction of the plurality of range measurements at the second time to produce a component of a position of a first point of the plurality of points in the direction of the plurality of range measurements at the second time; and
    generate a difference between the position of the point in the direction of the plurality of range measurements at the second time and the position of the point along the laser beam at the first time.

7. The system as in claim 2, wherein the analyzer configured to perform the minimization operation on the error metric over the unknown change in position is further configured to:
    determine a delay time representing a time elapsed between subsequent occurrences at which a beam points to the same position in a direction perpendicular to both the plurality of range measurements and the direction normal to the plurality of range measurements, the delay time minimizing the value of the error metric.

8. The system as in claim 7, wherein the delay time is constant over pairs of positions.

9. The system as in claim 2, wherein the analyzer configured to perform the minimization operation on the error metric over the unknown change in position is further configured to:
    perform a summation operation over a product of (i) a difference between the position of the first point in the direction of the plurality of range measurements at the second time and the position of the first point in the direction of the plurality of range measurements at the first time, and (ii) a difference between a position of the first point in a direction normal to the plurality of range measurements at the first time and a position of a second point in the direction normal to the plurality of range measurements at the first time.

10. The system as in claim 9, wherein the analyzer configured to perform the minimization operation on the error metric over the unknown change in position is further configured to:
    perform a summation operation over a square of the difference between a position of the first point in a direction normal to the plurality of range measurements at the first time and a position of a second point in the direction normal to the plurality of range measurements at the first time.

11. A method for determining a motion of an object, comprising:
    generating a plurality of range measurement and a velocity measurement for a plurality of points on the object; and
    determining, from the range and velocity measurements of the plurality of points on the object, a rotation of the object between a first time and a second time,
    determining, from the plurality of range measurements, a plurality of slope pairs at the first time, each of the plurality of slope pairs corresponding a respective point of the plurality of points on the object;
    generating, from plurality of slope pairs, absolute positions of the plurality of points on the object at the first time; and
    determining, from the absolute positions of the plurality of points on the object at the first time and the rotation of the object between the first time and the second time, a change in the position of the object between the first time and the second time in a direction orthogonal to a direction of the plurality of range measurements.

12. The method as in claim 11, wherein determining the change in the position of the object between the first time and the second time in the direction orthogonal to the direction of the plurality of range measurements includes:
    generating an error metric based on the absolute positions of the plurality of points on the object at the first time, a position of the plurality of points on the object at the second time, and an unknown change in position; and
    performing a minimization operation on the error metric over the unknown change in position to produce the change in the position of the object between the first time and the second time.

13. The method as in claim 12, wherein generating the error metric includes:
    producing, as the positions of the plurality of points on the object at the second time, the positions of the points closest to the plurality of points on the object at the first time.

14. The method as in claim 12, wherein generating the error metric include:
    generating a component of a position of a first point of the plurality of points in the direction of the plurality of range measurements at the second time based on the component of the position of the point along the laser beam at the first time and a slope of the slope pair corresponding to the position of the first point; and
    generating a difference between the position of the point in the direction of the plurality of range measurements at the second time and the position of the point along the laser beam at the first time.

15. The method as in claim 14, wherein the point is a first point, and
    wherein the generating the error metric includes:
    generating a product of (i) the difference between the position of the first point in the direction of the plurality of range measurements at the second time and the position of the first point in the direction of the plurality of range measurements at the first time, and (ii) a difference between a position of the first point in a direction normal to the plurality of range measurements at the first time and a position of a second point in the direction normal to the plurality of range measurements at the first time.

16. The method as in claim 12, wherein performing the minimization operation on the error metric over the unknown change in position includes:
    performing an interpolation operation on a component of a position of a third point and a fourth point of the plurality of points in the direction of the plurality of range measurements at the second time to produce a component of a position of a first point of the plurality of points in the direction of the plurality of range measurements at the second time; and
    generating a difference between the position of the point in the direction of the plurality of range measurements at the second time and the position of the point along the laser beam at the first time.

17. The method as in claim 12, wherein performing the minimization operation on the error metric over the unknown change in position includes:

determining a delay time representing a time elapsed between subsequent occurrences at which a beam points to the same position in a direction perpendicular to both the plurality of range measurements and the direction normal to the plurality of range measurements, the delay time minimizing the value of the error metric.

18. The method as in claim 17, wherein the delay time is constant over pairs of positions.

19. The method as in claim 12, wherein performing the minimization operation on the error metric over the unknown change in position includes:

performing a summation operation over a product of (i) a difference between the position of the first point in the direction of the plurality of range measurements at the second time and the position of the first point in the direction of the plurality of range measurements at the first time, and (ii) a difference between a position of the first point in a direction normal to the plurality of range measurements at the first time and a position of a second point in the direction normal to the plurality of range measurements at the first time.

20. The method as in claim 19, wherein performing the minimization operation on the error metric over the unknown change in position includes:

performing a summation operation over a square of the difference between a position of the first point in a direction normal to the plurality of range measurements at the first time and a position of a second point in the direction normal to the plurality of range measurements at the first time.

* * * * *